(12) United States Patent
Desai

(10) Patent No.: US 6,377,173 B1
(45) Date of Patent: Apr. 23, 2002

(54) GARAGE DOOR OPENER SIGNAL INCORPORATED INTO VEHICLE KEY/FOB COMBINATION

(75) Inventor: Tejas Desai, Sterling Heights, MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/661,351

(22) Filed: Sep. 14, 2000

Related U.S. Application Data

(60) Provisional application No. 60/157,062, filed on Oct. 1, 1999.

(51) Int. Cl.$^7$ .................................................. G08B 1/08
(52) U.S. Cl. ...................... 340/539; 340/426; 340/540; 340/10.1; 340/825.72; 340/825.69; 455/345; 455/99
(58) Field of Search ................................ 340/539, 426, 340/540, 425.5, 825.06, 825.3, 825.34, 825.32, 10.1, 10.3, 10.4, 10.41, 10.42, 10.5, 10.51, 10.52, 825.72, 825.69; 455/345, 99, 250.1, 151.2

(56) References Cited

U.S. PATENT DOCUMENTS

| | | | | |
|---|---|---|---|---|
| 5,307,048 A | * | 4/1994 | Sonders | 340/426 |
| 5,467,070 A | * | 11/1995 | Drori et al. | 340/426 |
| 5,614,891 A | * | 3/1997 | Zeinstra et al. | 340/825.22 |
| 5,627,529 A | * | 5/1997 | Duckworth et al. | 340/825.69 |
| 6,078,271 A | * | 6/2000 | Roddy et al. | 340/825.72 |
| 6,127,740 A | * | 10/2000 | Roddy et al. | 307/10.1 |
| 6,127,922 A | * | 10/2000 | Roddy et al. | 340/426 |
| 6,131,019 A | * | 10/2000 | King | 455/99 |
| 6,144,315 A | * | 11/2000 | Flick | 340/825.69 |
| 6,160,319 A | * | 12/2000 | Marougi et al. | 307/10.5 |
| 6,181,255 B1 | * | 1/2001 | Crimmins et al. | 340/825.69 |
| 6,188,326 B1 | * | 2/2001 | Flick | 340/825.69 |
| 6,282,152 B1 | * | 8/2001 | Kurple | 340/825.72 |
| 6,297,731 B1 | * | 10/2001 | Flick | 340/426 |
| 6,308,083 B2 | * | 10/2001 | King | 455/556 |

* cited by examiner

Primary Examiner—Nina Tong

(57) ABSTRACT

A unique system is provided for storing home security function signals such as garage door opener signals on a vehicle key/fob combination. The key/fob combination learns its coded signal from a control on the vehicle. In this way, the key/fob combination need not be provided with an expensive scanning receiver. The vehicle control preferably communicates to the key/fob combination through the LF receiver/transmitter that is already typically part of the vehicle immobilizer system. In further features, a coded key pad may be provided such that the system may be moved into a secure mode when the key/fob combination or vehicle is in the control of a valet. Further, the key/fob combination may be provided with a switch such that it can be moved into home or auto mode such that the number of switches on the key/fob combination may be reduced.

10 Claims, 1 Drawing Sheet

GARAGE DOOR OPENER SIGNAL INCORPORATED INTO VEHICLE KEY/FOB COMBINATION

This application claims priority to provisional application No. 60/157,062, filed on Oct. 1, 1999.

BACKGROUND OF THE INVENTION

This invention relates to the incorporation of a garage door opener signal into a standard key/fob combination.

Vehicles are being provided with more and more electronic components. As the number of electronic components increase, the controls for those components must also become more sophisticated. One common vehicle control is a so-called key/fob combination. A key/fob combination is a remote signaling device that can actuate a number of systems on a vehicle typically with an RF signal. As an example, trunk open, door unlock, door lock, etc. functions are provided on a key/fob combination. Further, vehicle immobilizer signals are incorporated into the key/fob combination or into the key itself. These signals are typically LF signals received by a control associated with the vehicle ignition. If the vehicle ignition determines that the key which has been inserted into the ignition lock is a proper key, then the vehicle is allowed to start. Otherwise, the vehicle will be prevented from starting.

All of these signals and associated controls must be provided into a relatively small size key/fob combination. Typically, this combination is carried in the pocket by an operator, and thus it is desirable to maintain the device as small as possible.

One other signaling feature incorporated into a vehicle is a garage door opener, or other home security function. Typically, a garage door opener button is provided in the vehicle such as in the headliner, etc. The provision of such a home security control has two main deficiencies. First, the control typically cannot be actuated if the ignition is not on. Further, it may sometimes be desirable to actuate the home security system from outside of the vehicle. However, the standard openers are incorporated into the vehicle. Moreover, the vehicle may sometimes be left with a parking attendant or valet. With the prior art home security systems, the valet can use a "code grabber" and actuate the garage door opener button to capture and learn the code associated with the home security system. This is of course undesirable.

SUMMARY OF THE INVENTION

In the disclosed embodiment of this invention, the home security code is stored at a key/fob combination. Since it would be too complex and expensive to provide a scanning receiver at the key/fob combination, a scanning capable receiver which is typically already incorporated into the vehicle is utilized to learn the home security system code. The vehicle then teaches this code to the key/fob combination. A series of steps to move the key/fob combination into a learn mode is utilized, and then the code is then taught from the vehicle scanning receiver to the key/fob combination.

In further features of this invention, the vehicle may still be provided with the home security function, in addition to the provision of the home security function on the key/fob combination. The home security function within the vehicle, the home security function within the key/fob combination, or both, can be provided with a switch such that access to actuation of the home security function can be blocked when the vehicle and key is left with a valet. In this way, the valet is not able to capture the code from the home security button.

In a further feature, to preserve space on the key/fob combination, the key/fob combination may be provided with a sliding switch which allows the key/fob combination to be moved between auto and home security functions. In the home security space, the buttons associated with auto functions may be instead associated with home functions. As an example, the auto door unlock may become home entry or front door open or auto trunk actuation may become home garage door actuation when the sliding switch is moved to the home position.

These and other features of the present invention may be best understood from the following specification and drawings, the following of which is a brief description.

DETAILED DESCRIPTION OF A PREFERRED EMBODIMENT

Figure 1:
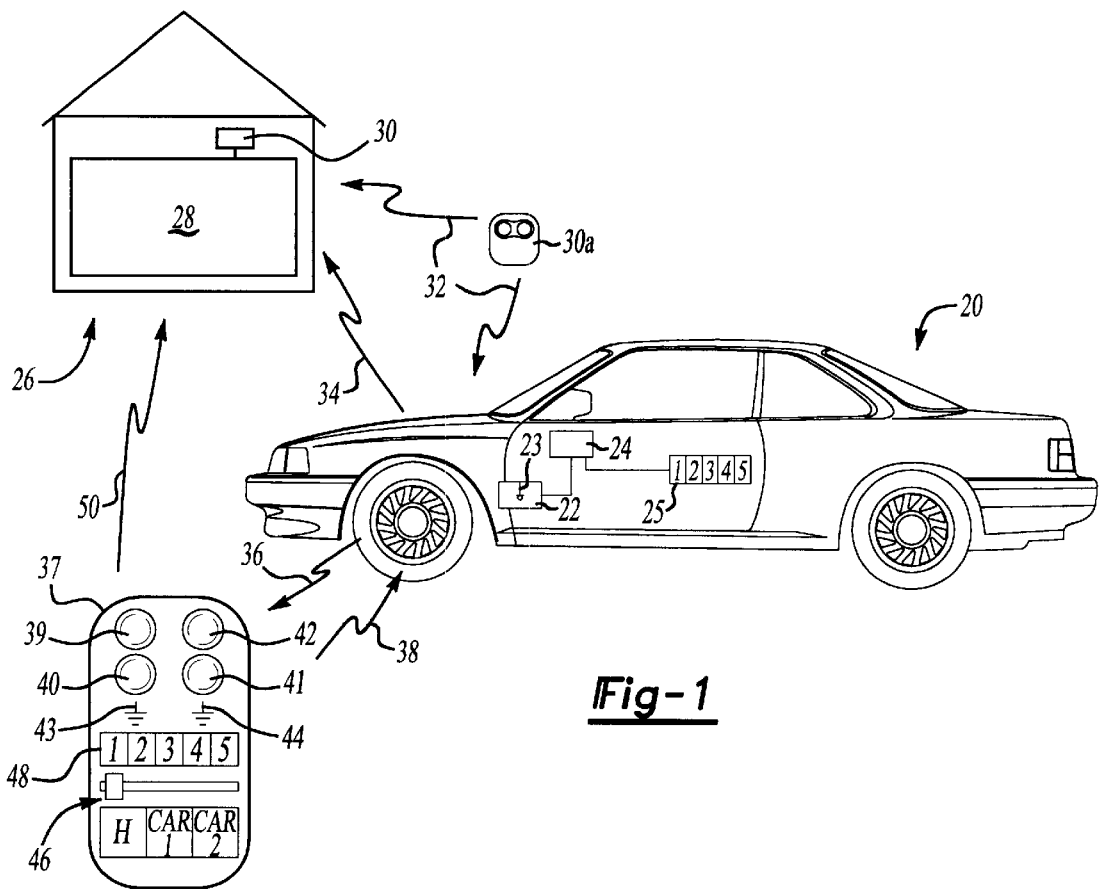
FIG. 1 is a schematic view of a system incorporating the present invention.
Figure 2:
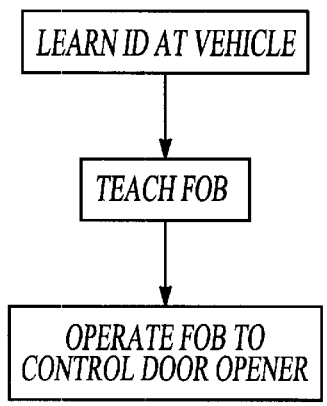
FIG. 2 is a flowchart of the present invention.

FIG. 1 shows a vehicle system 20 incorporating a control 22 having a scanning receiver 23. The control 22 communicates with a home security system actuator 24 such as may be utilized to open a home security system 26. Home security system 26 is shown as a garage door 28, associated with a garage door opener 30 and garage door opener remote control 30a. The scanner 23 is utilized to learn the operating frequency and code from the garage door remote opener control 30a. As is known, control 30a will typically transmit an RF signal in the part 15 band. Once the control 22 has learned the frequency and code from control 30, through signal 32, this information is stored. The garage door opener actuator 24 may be utilized to send the signal 34 to the garage door opener 30 to open the garage door 28. A key pad 25 may be utilized to enter a code which may be known to the operator such that actuation of the garage door opener actuator 24 can be blocked when the vehicle is in the control of a valet, or is otherwise outside the control of the operator. In this way, as mentioned above, the code may be kept more secure. Key pad 25 can also be used to send signal 34 from actuator 24 when an authorized code is entered.

One main feature of the invention is found in transmitting the code from the control 22 to a key/fob combination 37. In this way, the key/fob combination 37 can be provided with the code for opening the garage door 28. The operator will thus have portable and ready access to a garage door opener. Although portable garage door openers are known, they are typically relatively large, and typically only provide that single functioning. Thus, they are typically not carried by the operator of the vehicle, and certainly not outside of the vehicle.

The key/fob combination 37 is preferably of the combi-key style, and would have both an LF transmitter and receiver for operation of an immobilizer system, and an RF transmitter. The signal 36 from the control 22 would typically be an LF signal which is received on the key/fob combination 37. The key/fob combination 37 is provided with the LF receiver/transmitter for its immobilizer function, and thus no additional receiver need be incorporated into the key/fob combination to store the garage door opening function.

As is known, some series of steps is utilized to move the control 22 and key/fob combination 37 into a teach mode. As an example, one could cycle the ignition a number of times (i.e., five) and leave the ignition in an on position. The vehicle would then send an LF challenge (signal 36) to the key/fob combination 37. The key/fob combination 37 would respond with its code (signal 38). The vehicle would then provide a signal (signal 36) to the key/fob combination 37 that it is in a learn mode. This would occur such as by cycling locks or honking the horn. A user could then present some signal from the key/fob combination (pressing the lock button a set number of times) to indicate that it is desired to teach the key/fob combination the garage door opener signal. The vehicle may then again provide the feedback such as cycling the locks or honking the horn. The user may now press a learn button (which could be a series of actuations of switches on the control). The vehicle scanner may scan the FCC part 15 band to find the frequency of operation from the door opener 30. Ideally, this would occur by first searching the most used of frequencies to the least used for remote control devices. Once the frequency is determined the vehicle receiver is set to that frequency and then listens for data packets. The vehicle may then determine if a received data packet is one of the known format of encrypted communication. If the data packet is known, the transmitter information (secret keys, fob ID, synchronization counter, configuration word, etc.) is then calculated and stored. Otherwise the data packet is stored as a digital combination of analog symbols. Once the packet has been learned, the vehicle provides feedback to the user that the learn operation has been successful. The user may then momentarily press a transmitter button to receive a programming verification from the vehicle. The vehicle compares the received transmission from the garage door opener remote control 30a to an expected transmission. A direct comparison of a fixed code and verifies decryption on a secure remote device.

Once the remote device is learned by the vehicle the vehicle uses its LF link to encrypt and transmit the information to the key/fob combination. Once transmitted, the vehicle will request a sample transmission from the key/fob combination and compare this to a verification transmission from the remote home security device. If the data received from the key/fob combination is the same as that received from the remote device, then programming is considered successful. The vehicle would then provide feedback.

The fob 37 can then send its signal 50 to the opener control 30 directly.

The above is simply one method of teaching a garage door opener code to a key/fob combination. Moreover, in the above example, there is no separate control 24 that is within the vehicle. Other methods and ways of moving the systems into learn modes may be utilized. The thrust of this invention is the storing of the information on the key/fob combination, and the provision of a secure mode for valet purposes.

The key/fob combination 37 incorporates switches 39, 40, 41, 42 which perform functions such as trunk unlock, door unlock, door lock, panic, etc. An LF transmitter/receiver 43 and an RF transmitter 44 are incorporated, as are commonly known. A sliding switch 46 is utilized to move the key/fob combination between home functions and the ability to select between two vehicles (car 1 and car 2). In this way, the switches 39, 40, 41, 42 can be utilized for actuation of systems on the car, or can be utilized to actuate a plurality of home security systems. As an example, door unlock may be utilized to unlock doors on a vehicle when the switch 46 is in one of the auto positions, but may also open the garage door opener when switch 46 is in the home position. In this way, the provision of the home security function into the key/fob combination does not require additional switches.

In addition, a key pad 48 may be utilized that allows the operator to move the key/fob combination into a secure mode for times when the key/fob combination is entrusted to a valet. In this way, the valet will not be able to download the garage door information, or perhaps will not be able to download other RF transmissions. A simple code will be programmed into the key/fob combination to move it into a secure mode, once entered into pad 48, and the operator will have a code to move the key/fob combination back into normal mode.

The functions described above can be achieved by appropriate software and hardware which is within the skill of a worker in this art. It is the provision of these functions which is inventive here.

Although a preferred embodiment has been disclosed, a worker in this art would recognize that modifications would come within the scope of this invention. For that reason, the following claims should be studied to determine the true scope and content of this invention.

What is claimed is:

1. A method of controlling a home security function and a vehicle security function through a portable remote control device which can be carried from a vehicle by a user comprising the steps of:

1) providing a remote signaling device having switches for providing signals for actuating security systems on a vehicle, and for actuating a home security function, said remote signaling device being relatively small and portable outside of said vehicle;

2) learning a code for a home security by signals scanner at a control on a vehicle for scanning signals from an actuated home security remote control unit, and transmitting said learned code via a wireless transmitter to said remote signaling device from said control on the vehicle; and 3) utilizing said remote signaling device to operate said vehicle security functions, and further to operate said home security function remotely from said vehicle and from said home security system, respectively.

2. A method as set forth in claim 1, wherein said remote control device is provided with a switch to select operation in vehicle and home functions and moving said switch to select operation in one of said home and vehicle functions.

3. A method as set forth in claim 1, wherein the further step of providing structure for moving said remote signaling device into a secure mode at which a valet is unable to actuate said home security system signal is included.

4. A method as set forth in claim 1, wherein said vehicle captures an RF (radio frequency) signal from said home security system and transmits a LF (low frequency) signal to said remote signaling device through an LF communication connection between said vehicle and said remote signaling device.

5. A method as set forth in claim 4, wherein said LF communication connection on said vehicle and said remote signaling device is part of a vehicle immobilizer system.

6. The combination of a vehicle and a home security system comprising:

a remote signaling device having a transmitter and receiver, and said remote signaling device having switches for actuating security systems on a vehicle, and for actuating a home security system, and for storing codes associated with both said vehicle security and said home security systems;

a home security system having a transmitter and receiver, said home security system being operable to transmit a code signal indicative of a code which may be learned to actuate said home security system, and to receive signals from said remote signaling device; and a vehicle incorporating vehicle security systems, and a control and receiver for receiving said signal from said home security system, and for learning said code signal from said home security system and for transmitting said code signal to said remote signaling device after having learned said code signal from said home security system, said remote signaling device then being capable of transmitting said code signal to be received by said home security system.

7. A system as set forth in claim 6, wherein said vehicle control incorporates an LF transmitter and receiver for communicating with an LF transmitter and receiver associated with said remote signaling device, and said LF transmitter and receiver being part of a vehicle immobilizer system.

8. A system as set forth in claim 6, wherein a switching device is provided for blocking transmission of said code signal associated with said home security system when at least one of said remote signaling device and said vehicle are outside of the control of an operator.

9. A system as set forth in claim 8, wherein said switching device includes a key pad.

10. A system as set forth in claim 9, wherein said remote signaling device is provided with a switch such that said remote signaling device can be moved into a home mode or a vehicle mode, and said switch on said remote signaling device allowing said remote signaling device to actuate different functions and different signals when in said home and said vehicle mode.

* * * * *